United States Patent [19]

Wright

[11] 4,400,022
[45] Aug. 23, 1983

[54] TUBE CONNECTOR

[75] Inventor: Fred Wright, Chester, N.J.

[73] Assignee: Simmonds Precision Products, Inc., Tarrytown, N.Y.

[21] Appl. No.: 219,139

[22] Filed: Dec. 22, 1980

[51] Int. Cl.³ .............................................. F16L 33/20
[52] U.S. Cl. .................................... 285/256; 285/259; 285/DIG. 4
[58] Field of Search ............... 285/251, 259, 256, 244, 285/318, DIG. 4

[56] References Cited

U.S. PATENT DOCUMENTS

| 2,253,691 | 8/1941 | Darling ........................... | 285/259 X |
| 2,374,226 | 4/1945 | Melsom ........................... | 285/256 X |
| 2,430,921 | 11/1947 | Edelmann ....................... | 285/259 X |
| 2,768,845 | 10/1956 | Samiran .......................... | 285/256 X |
| 2,799,520 | 7/1957 | De Rocher ..................... | 285/251 |

FOREIGN PATENT DOCUMENTS

| 238158 | 3/1962 | Australia .............................. | 285/256 |
| 170535 | 7/1934 | Switzerland ........................ | 285/251 |
| 741643 | 12/1955 | United Kingdom ................ | 285/259 |
| 880324 | 10/1961 | United Kingdom ................ | 285/256 |

Primary Examiner—Thomas F. Callaghan
Attorney, Agent, or Firm—Edwin E. Greigg

[57] ABSTRACT

An end connector including a threaded nipple end that cooperates with a spring and swage sleeve to secure the end connector to a convoluted plastic tube. The swage sleeve fits over the spring in the convolutions of the plastic tube in order to secure the plastic tube to the nipple by the spring forcing the tube into the threads of the nipple.

1 Claim, 2 Drawing Figures

U.S. Patent  Aug. 23, 1983  4,400,022
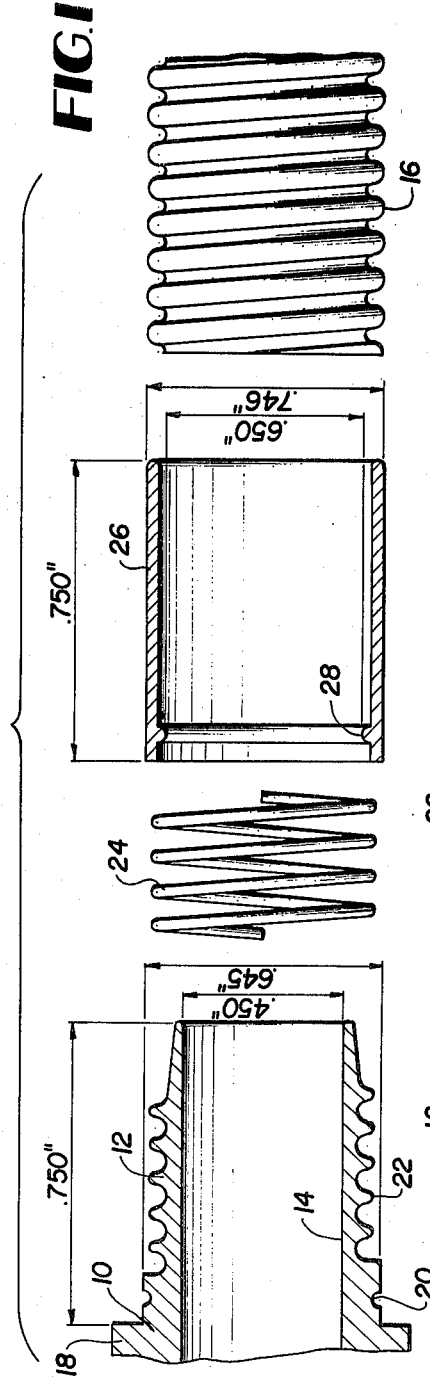
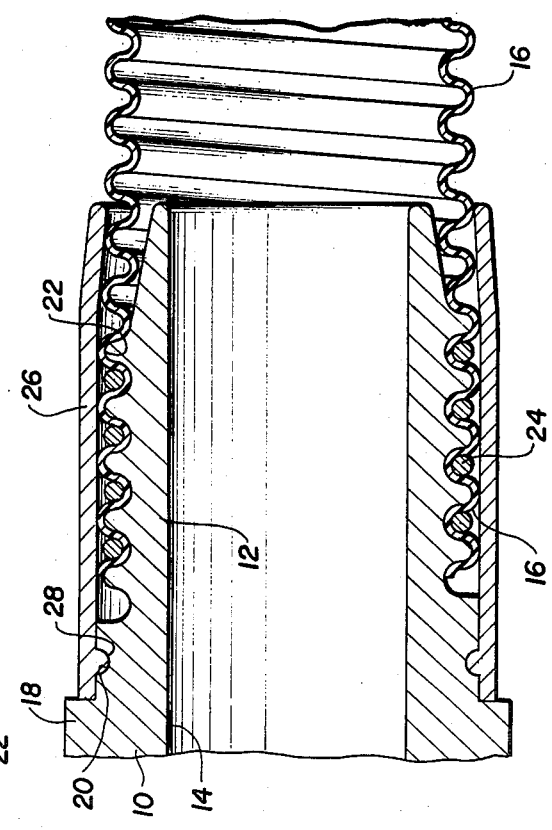

TUBE CONNECTOR

BACKGROUND OF THE INVENTION

This invention relates to end connectors and more particularly to end connectors for convoluted extruded plastic tubes for conduit assemblies.

Heretofore various types of end connectors have been used for conduits, piping, flexible hoses, etc. These are of various designs and combination of elements with some made of several pieces that cooperate to hold the tubing and the connector together.

OBJECT AND SUMMARY OF THE INVENTION

The end connector of this invention is of a simple design and made to strengthen the termination end of convoluted extruded plastic tubing by providing inner and outer elements that cooperate to secure the tube to the connector end.

An object of the invention is to secure an end connector to an extruded plastic tube which will not only provide a secure connection but is of simple construction and strengthens the tube end.

The invention will be better understood and further objects and advantages thereof will become more apparent from the ensuing detailed description of a preferred embodiment taken in conjunction with the drawing.

BRIEF DESCRIPTION OF THE DRAWING

FIG. 1 is an exploded view in cross section which illustrates the relative parts; and FIG. 2 is an axial view in cross-section.

DESCRIPTION OF THE PREFERRED EMBODIMENT

Now referring to the drawing where like reference characters refer to like parts there is shown in an exploded view the elements that make up the connector. As shown, the connector is formed by an end fitting 10 (male or female), which is shown cut off at the connector end, and a nipple end 12. The nipple end fitting is provided with a uniform inner diameter 14 which is slightly less than the diameter of the extruded plastic tube 16 to which the end connector is to be connected. The connector is provided with an outer shoulder 18 between the connector end 10 and the nipple end 12 which is of greater diameter than that of the extruded tube. The nipple end 12 extends from the shoulder and is provided with a U-shaped groove or valley 20 adjacent the shoulder 18 and is threaded on its outer surface to include threads 22 from a point removed from the U-shaped groove to the end of the nipple to form risers and valleys in the outer surface. The threads are formed as a spiral thread equal to the pitch of the convolutions of the extruded tube to which it is to be connected and slightly larger in diameter than the plastic tube. The last thread near the outer end is removed and the outer surface of the nipple end is sloped such as to 10 degrees relative to the inner surface of the nipple end and any sharp edges are removed.

In order to secure the extruded plastic tube to the connector, a locking spring 24 and a swage sleeve 26 are used. The locking spring 24 may be made with the same number of turns as there are threads on the nipple with an outside diameter which fits the minor diameter of the outside diameter of the convoluted plastic tube. The inner diameter of the swage sleeve is slightly greater than the outside diameter of the nipple at the bottom edge of the flange so that the end of the swage sleeve will fit over the nipple. One end of the swage sleeve is provided with a ridge 28 on its inner surface such that the inner flange will mate with the U-shaped groove in the nipple end thereby securing the swage sleeve in place against any forces that would remove the plastic tube and flange.

In assembly, the spring is threaded onto the convoluted plastic tube and the swage sleeve is slipped over the spring on the tube end with the flanged end of the swage sleeve extending outwardly of the end of the plastic tube. The nipple end of the connector is then threaded into the convoluted plastic tube whereby the spring and convolutions of the plastic tube will mate with the threads on the end of the connector nipple. The locking spring end of the plastic tube is threaded onto the connector nipple until the ridge 28 on the inner surface of the swage sleeve mates with the U-shaped groove 20 in the connector nipple. The ridge 28 on the inner surface of the swage sleeve prevents the swage sleeve from coming loose from the connector and the spring and plastic tube are clamped between the swage sleeve and the threads on the end connector nipple. Therefore, the plastic tube cannot pull loose from the connector. The inner surface of the swage sleeve applies an inward force on the spring to hold the plastic tube in place.

The end connector may be assembled without any special tools since the only requirement is that the parts be screwed together.

The dimensions shown are for a ½ inch inside diameter convoluted plastic tube.

The swage sleeve may be formed of aluminum or any other suitable material. One such material is a shaped memory metal such as 55 NITINOL (Cu-Zn-AL alloy). The spring may be made of stainless steel or any other suitable material. The end connector fitting may be made of aluminum or any other suitable material in order to be compatible with the swage sleeve.

If it is desired to increase the tensile strength of the extruded plastic tube a metallic or polymer plastic braid may be formd over the outer surface of the plastic tube.

Further, if it is desired that the connector be leak-proof, the nipple may be coated with a sealant prior to being threaded into the end of the plastic tube.

The threaded surface may be abrasive blasted to provide an anti-rotational feature where the polymer enters the micropores of the metallic fitting when tightened on the thread. Such an anti-rotational feature could preclude the need for an encompassing crimping device when using internally non-pressurized conduit assemblies.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. An end connector for convoluted extruded plastic tubes having outer and inner surfaces in which:
   said end connector includes a connecting end, and a nipple end which has an outer diameter which is greater than the normal inner surface diameter of said plastc tube;

said end connector includes a radially extending shoulder between said connecting end and said nipple end;

a U-shaped valley in the outer surface of said nipple end of said connector near said shoulder;

an outer swage sleeve means having a smooth inner surface;

said swage sleeve includes a ridge on its inner surface near one end which mates with said U-shaped valley in said end connector when said one end is adjacent said shoulder on said nipple end of said connector;

a continuous spring means;

said spring means being fitted axially over the exterior surface of said plastic tube and having an axial length which is less than said nipple end of said connector;

said swage sleeve means being fitted axially over said spring means; said nipple end of said connector having a irregular outer surface in the axial direction formed by risers and valleys which form screw threads with the same pitch as said convoluted plastic tube and an end portion adjacent said formed threads which has a decreasing outer diameter, said nipple end being fitted into one end of said plastic tube with said plastic tube secured radially between said nipple risers and said swage sleeve and between said nipple and said spring means with said spring means of less diameter than said risers on said nipple end;

whereby said outer swage sleeve means forces said spring means into said valleys on said nipple end thereby securing said plastic tube to said nipple end between said spring and said valleys in said nipple end of said connector and between said risers and said swage sleeve with said ridge on said swage sleeve means secured in said U-shaped valley in said connector end against removal.

* * * * *